United States Patent [19]

Reid et al.

[11] Patent Number: 5,318,483
[45] Date of Patent: Jun. 7, 1994

[54] SPROCKET WITH ASYMMETRICAL TEETH FOR MINING CONVEYORS

[75] Inventors: William J. Reid, Bristol, Tenn.; Clarence L. Bandy, Jr., Glade Spring, Va.

[73] Assignee: American Longwall Face Conveyors, Inc., Abingdon, Va.

[21] Appl. No.: 61,925

[22] Filed: May 14, 1993

[51] Int. Cl.⁵ .......................................... F16H 55/17
[52] U.S. Cl. ..................................... 474/152; 474/157
[58] Field of Search ............... 474/152, 153, 155–157, 474/162; 198/834

[56] References Cited

U.S. PATENT DOCUMENTS

| | | |
|---|---|---|
| 2,286,666 | 6/1942 | Briggs . |
| 2,529,168 | 11/1950 | Marshall et al. . |
| 3,265,191 | 8/1966 | Low . |
| 3,495,468 | 2/1970 | Griffel ................................. 474/157 |
| 4,095,478 | 6/1978 | Rynik . |
| 5,263,575 | 11/1993 | Ledet ............... 474/157 X |

Primary Examiner—Thuy M. Bui
Attorney, Agent, or Firm—King & Schickli

[57] ABSTRACT

A unidirectional sprocket includes a hub and a series of radially arrayed sprocket teeth. Each of the sprocket teeth include a root at the point of connection with the hub, a radially extending split body and twin outwardly projecting points at the distal or outermost end. Forward and rearward flanks extend from the root radially outwardly, while forward and rearward faces extend radially inwardly from the pitch circle. Each of the sprocket teeth is asymmetrical with a forward offset. Thus, the point is shifted in the drive direction toward the forward face and flank, and shifted away from the rearward face and flank. Each of the teeth also includes a forward landing area formed above the forward flank and a rearward landing area formed above the rearward flank. Together, the forward and rearward faces and landing areas of adjacent teeth define a split chain link seat for engaging the chain being driven. The rearward landing area is longer than the forward landing area due to the forward offset, and the forward landing area is raised with respect to the rearward landing area.

10 Claims, 1 Drawing Sheet

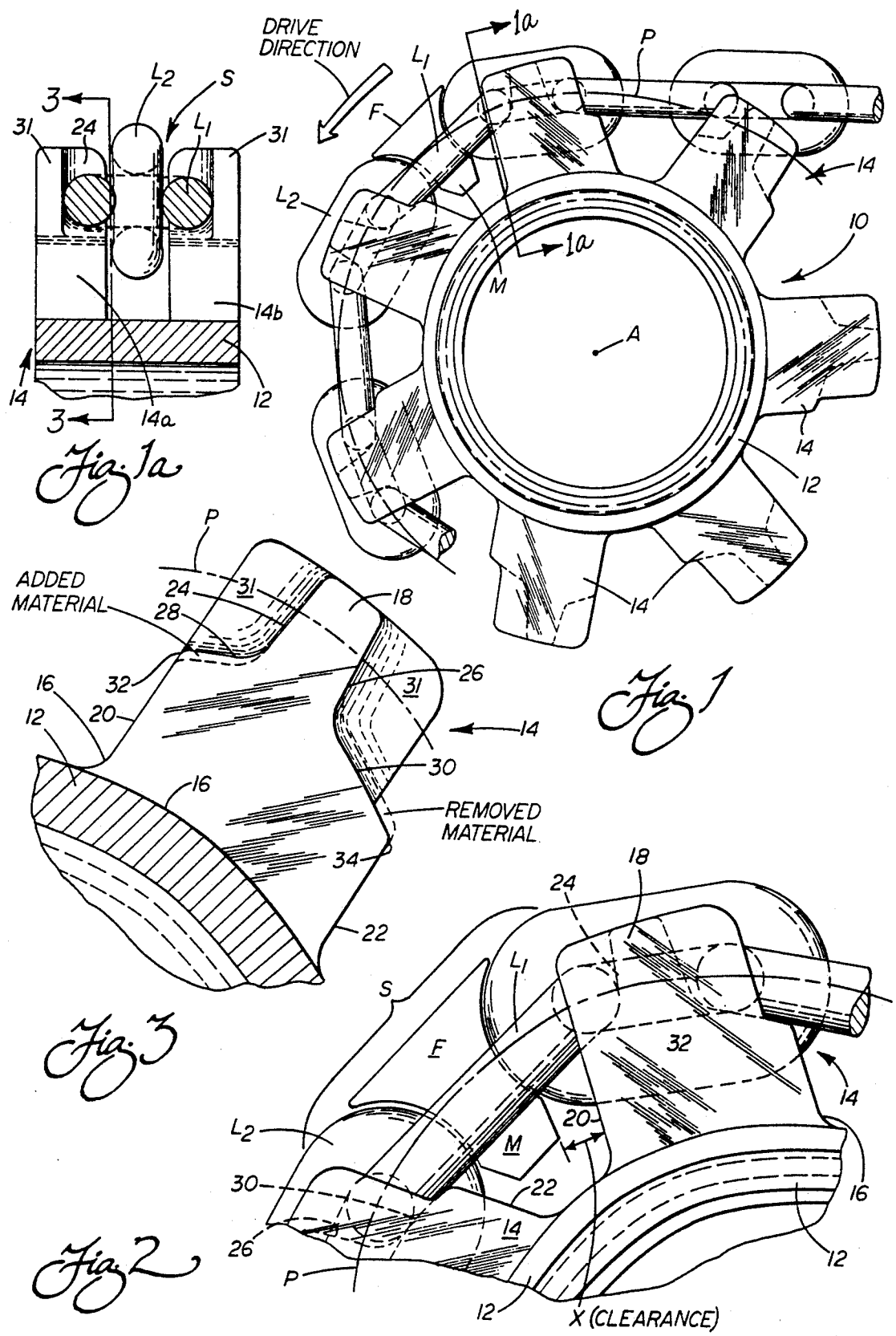

SPROCKET WITH ASYMMETRICAL TEETH FOR MINING CONVEYORS

TECHNICAL FIELD

The present invention relates generally to chain drive systems and, more particularly, to a sprocket for utilization on heavy equipment, such as armored face conveyors and beam stage loaders.

BACKGROUND OF THE INVENTION

It has long been known in the art to drive a conveyor chain, such as utilized on armored face conveyors, by means of a specially designed sprocket including spaced teeth for engaging the sequential horizontal links of the chain. While such a drive system is efficient and effective for this and other purposes, rapid wear of the teeth can be a serious problem. Specifically, the harsh operating environment of mining equipment is the primary cause of tooth wear. As a result of heavy loading, relatively high operating speeds and the presence of particulate material, including coal fines, sand, and small rock particles, trapped at the driving interface between the sprocket tooth and chain, wear is accelerated. Accordingly, the service life of the sprocket is drastically reduced.

As a result, productivity is lost through the need to relatively frequently take the conveyor out-of-service for repair. To a lesser degree, conveyor drive chains are vulnerable to this wear and must be periodically repaired or replaced. More specifically, as the driving face of the sprocket teeth wear, the conveyor flights, each including a crossbar and clamp, that pass through selected, spaced horizontal links for pushing the coal or other aggregate material, eventually come into contact with the teeth. This results in interference and jamming of the conveyor. The interference engagement occurs between the trailing face of each flight and the leading flank of the next tooth. When this occurs, it usually necessitates replacement of the entire sprocket, which is not only time consuming, but very costly.

In the prior art, sprockets have typically incorporated teeth with a symmetrical profile, that is the point of each tooth is centered with respect to its root and body. In this way, substantially equal clearance is provided between the flights at the point where they extend through the horizontal chain links, and both flanks of the teeth. This approach does allow for maximum clearance between the flights and the teeth in both directions for efficient bidirectional operation of the conveyor.

However, the one drawback of this design is that most of the wear on the teeth of a sprocket in mining conveyors, and in other similar applications, occurs in the predominately utilized, forward driving direction. Hence, sprocket teeth of symmetrical design adapted for bidirectional operation inherently compromise the overall service life of the sprocket. There is no compensation for the uneven wear that typically occurs. It has been discovered that surprisingly once a typical bidirectional tooth is worn to a point of interference with the flight, there is still plenty of strength left in the tooth to operate for an extended time. But for the interference that occurs, the conveyor could continue to operate for many more productive hours before being taken out-of-service for repair.

One prior art method for addressing this general wear problem is disclosed in U.S. Pat. No. 4,095,478 to Rynik. The Rynik patent discloses a drive sprocket for mining machines wherein every other tooth is removed. The theory is that part of the load on the teeth is relieved by the frictional engagement of the chain with the sprocket hub, and therefore wear of the remaining teeth is reduced. In practice, however, this approach has proved unsatisfactory. The frictional engagement force is simply not sufficient to compensate for the direct driving engagement force lost by removal of the teeth. Particularly in modern conveyors with driving requirements of several hundred horsepower, this prior art arrangement does not work well, and thus the concept remains unadopted in the industry. No other known prior art arrangement identifies, much less provides a feasible solution to the problem.

A need is therefore identified for a new approach in addressing the wear problem of sprockets, and particularly for providing a longer service life for sprockets particularly adapted to be utilized on heavy equipment in harsh environments, such as on mining conveyors.

SUMMARY OF THE INVENTION

Accordingly, it is a primary object of the present invention to provide a new and improved sprocket having a novel unidirectional tooth design providing for increased wear and enhanced service life.

Another object of the invention is to provide a sprocket including a series of asymmetrical sprocket teeth each having a forward offset (i.e. each tooth is moved forward in the drive direction), whereby the clearance between the flights of the conveyor and the forward flank of each driving tooth is increased. This proportionally increases the service life of the sprocket, thereby extending the repair and maintenance interval and ultimately resulting in increases in overall productivity of the conveyor.

Yet another object of the present invention is to provide an improved sprocket with sprocket teeth including raised forward and lowered rearward landing areas, and wherein these landing areas, of adjacent teeth define a split chain seat. When a link is nested in the chain seat, the raised forward landing area provides additional material that must also be worn away before the flights can engage the forward flanks of the teeth and cause interference with the conveyor operation. Hence, the useful life of the sprocket is further increased.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved sprocket is provided that is especially adapted to engage a chain in a novel manner in order to provide an extended overall service life. The sprocket includes a hub for mounting on the drive shaft of a drive system. An array of sprocket teeth are integrally formed on the hub, and extend radially outwardly.

In the preferred embodiment, the teeth are split into twin sections so as to engage the sides of the horizontal links for driving. The alternate vertical links extend downwardly to nest into the space between the sections. The teeth define a pitch circle that is directly related to the clearance between the flight and the leading flank of the adjacent tooth for acceptable operation. In a typical installation, and according to the preferred embodiment proportionally shown in the drawings for illustrative purposes only, a 38×126 chain carries a flight of approximately 45 mm thickness at the pitch circle, and the chain is mated with a 7 tooth sprocket with pitch circle diameter (PCD) of 568 mm. Advantageously in this illustration, the effective flight/flank clearance is increased from 18.62 mm for a prior art bidirectional sprocket to 30 mm, a 61% increase for the unidirectional sprocket of the present invention. In turn, essentially a 61% increase in the life of the sprocket is attained.

Each of the sprocket teeth include a root at the point of connection with the hub, a radially extending split body and twin outwardly projecting points at the distal or outermost end. Forward and rearward flanks extend from the root radially outwardly, while forward and rearward faces extend radially inwardly from the pitch circle.

In accordance with an important aspect of the present invention each of the sprocket teeth is asymmetrical with a forward offset. Thus, the point is shifted in the drive direction toward the forward face and flank, and shifted away from the rearward face and flank. Each of the teeth also includes a forward landing area formed above the forward flank and a rearward landing area formed above the rearward flank. Together, the forward and rearward faces and landing areas of adjacent teeth define a split chain link seat for engaging the chain being driven.

Preferably, both the forward landing area and rearward landing area are elongated with the rearward landing area being longer than the forward landing area. Thus, it should be appreciated that the chain link seat is also shifted forward with the point. Additionally, the forward landing area is raised by added material relative to the rearward landing area.

Advantageously, the unique structural arrangement of the teeth being described provides a number of significant benefits allowing particularly smooth and efficient operation, while reducing the effects of wear and thereby extending effective service life. Accordingly, service intervals may be expanded and the equipment may therefore be operated in a more productive manner.

It should be appreciated that the forward offset of the point of each tooth, and the added landing material (3–5 millimeters in thickness) thus provided at the interface with each chain link, significantly increases the service life of the sprocket. More specifically, the forward offset effectively increases the clearance between each flight carried on the chain and the vertically extending forward flank/face of the adjacent tooth, and thus the amount of material available to be worn away is, in turn, increased. The added material of the forward shift to the flank and face of each tooth is calculated to leave sufficient tooth structure to meet the design force specifications of the conveyor when completely worn down; i.e. when interference occurs with the flight, the tooth still has a strength threshold meeting the design specs.

The added sprocket material raising the forward landing area effectively increases the surface that also must be worn away before any interference occurs between the flight and the adjacent tooth. Advantageously, by providing within the same design both a greater clearance and extra material at the point of contact with the chain, service life is enhanced in a unique and novel manner.

Describing the invention in more detail with respect to the typical installation set forth above, the ratio of elongation between the rearward and forward landing areas as measured at the pitch circle is between approximately 1.5:1–2.0:1. More preferably, the ratio is 1.7:1.

Additionally, it should be appreciated that the forward flank is recessed toward the point at the pitch circle between approximately 22–38 millimeters. In contrast, the rearward flank is recessed toward the point at the pitch circle between 44–60 millimeters. The point at the pitch circle is approximately 38 millimeters thick in the direction of rotation.

Finally, the height of the tooth between the root and the forward landing area is between approximately 70–76 millimeters along the leading edge and between approximately 89–92 millimeters at the pitch circle. In contrast, the height of the tooth between the root and the rearward landing area is between approximately 57–64 millimeters along the trailing edge, and also between approximately 89–92 millimeters at the pitch circle. By constructing the teeth in this manner, the significant benefits and advantages described are attained.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawing and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 1 is a side elevational view showing the preferred embodiment of the sprocket of the present invention and driving a chain of an armored face conveyor;

FIG. 1A is a section taken along line 1A—1A of FIG. 1, and illustrating the twin tooth sections and the nesting of the chain links;

FIG. 2 is an enlarged, partial side elevational view also showing the nesting of the chain links in the chain seat defined by the sprocket teeth; and FIG. 3 is an enlarged view of one of the twin tooth sections taken along line 3—3 of FIG. 1A.

Reference will now be made in detail to the present preferred embodiment of the invention, an example of which is illustrated in the accompanying drawing.

DETAILED DESCRIPTION OF THE INVENTION

Reference is now made to FIG. 1 and 1A showing a unidirectional sprocket 10 of the present invention, including a hub 12 and a series of sprocket teeth 14 integrally formed thereon. The teeth 14 are radially arrayed and split into twin axially spaced sections 14a, 14b. Taken together the teeth 14 define a pitch circle P having a radius equivalent to the distance from the driving axis A to the pitch point of a chain C being driven.

For purposes of the present description, the sprocket 10 is being described for mounting on a drive shaft (not shown) of an armored face conveyor. Teeth 14 are being shown engaged with horizontal links $L_1$ of the conveyor drive chain C. As is known in the art, the drive chain C includes alternate vertical links $L_2$, that nest between the tooth sections 14a, 14b. Clamps M are provided for holding laterally extending flights F on the horizontal links $L_1$. As is known in the art, these flights F move the coal or other material being mined along the conveyor pan (not shown) during conveyor operation.

As illustrated in FIGS. 2 and 3, each of the sprocket teeth 14 with the spaced sections 14a, 14b includes a root 16 at the point of connection with the hub 12. An outwardly projecting point 18 forms the distal or outermost end of each tooth 14; that is, the part beyond the pitch circle P. Forward and rearward flanks 20, 22, respectively, extend outwardly from the root 16. Forward and rearward faces 24, 26, respectively, extend radially inwardly from the pitch circle P.

As should be appreciated from viewing FIGS. 2 and 3, each sprocket tooth 14 has an asymmetrical construction with a forward or drive direction offset. Specifically, the point 18 and axis of each tooth is positioned closer to the forward flank 20 than to the rearward flank 22.

Additionally, each tooth 14 includes a forward landing area 28 formed above the forward flank 20 and rearward landing area 30 formed above the rearward flank 22. As will be described in greater detail below, the forward and rearward drive faces 24, 26 and landing areas 28, 30, of the tooth sections 14a, 14b define a split chain link seat, generally designated by reference indicia S (see FIG. 1A). The seat S receives the horizontal link $L_1$ so as to provide for cooperatively engaging and driving the chain C (note also particularly FIG. 2).

In accordance with a further aspect of the present invention, it should be appreciated that the forward landing area 28 extends from a leading edge 32 of the forward flank 20; the rearward landing area 30 extending from a trailing edge 34 of the rearward flank 22. The offset of the point 18 and the faces 24, 26 is effectively defined by the rearward landing area 30 being longer than the forward landing area 28 (see FIG. 3).

Specifically, the ratio of elongation between the rearward and forward landing areas, as measured at the pitch circle P is between substantially 1.5:1 and 2.0:1 and more preferably substantially 1.7:1. This produces a forward offset of the tooth sections 14a, 14b that effectively allows for increased clearance between the flight F/clamp M on the horizontal link $L_1$ and the leading edge 32 of the next-in-line tooth. In other words, in the forward driving direction additional wear is allowed before the flight F/clamp M comes into interference contact with the flank 20, defined by the leading edge 32 (see clearance X in FIG. 2).

With this arrangement, the sprocket 10 is essentially converted for unidirectional drive of the conveyor. However, if necessary to momentarily clear a jam of the conveyor, operation in the reverse direction is allowed. A key objective of conserving the available wear of the teeth 14 in the forward direction is realized.

As mentioned above, to provide an exemplary sprocket 10 for establishing the specific dimensions and ratios, reference is being made to the 38×126 standard chain C with the flight F of approximately 45 mm thickness at the pitch circle C with a PCD of 568 mm. The forward drive face 24 of each tooth 14 is in this example moved forward so that the distance to the leading edge 32 is between 22–38 millimeters at the pitch circle P and the rearward face 26 is also moved forward so to be between 44–60 millimeters from the trailing edge 34 at the pitch circle P. Preferably, each tooth 14 is substantially 38 millimeters thick between the forward and rearward faces 24, 26 at the pitch circle P.

As should also be appreciated from viewing FIG. 3, the forward landing area 28 is raised or projects further outwardly from the axis A than the rearward landing area 30. More specifically, the distance or height of the forward flank 20, that is between the root 16 and the forward landing area 28 at the leading edge 32, is between substantially 70–76 millimeters; whereas, the rearward flank 22 is substantially 57–64 millimeters.

The slope of the forward and rearward landing areas 28, 30 is gradually upward. The added material and slope of the landing areas is illustrated in FIG. 3, and is approximately 18° to 27° with respect to a line generally parallel to the pitch circle P.

A number of significant advantages result from the asymmetrical tooth construction just described. As mentioned above, the forward and rearward landing areas 28, 30 of adjacent teeth 14 and the twin driving faces 24 define a chain seat S for engaging each horizontal link $L_1$ of the chain C being driven. As shown in FIG. 2, the forward offset effectively increases the clearance between the flight F/clamp M and the leading edge 32 and the forward flank 20 of the trailing tooth 14, from a prior art standard of approximately 18.62 millimeters to substantially 30 millimeters. Because of this net gain in clearance space of approximately 11.38 millimeters, the life of the sprocket 10 is substantially increased, i.e. the sprocket can wear an additional 11.38 millimeters in the main drive direction before it has to be replaced. As pointed out above, this represents about a sixty one percent (61%) improvement in useful life over prior art designs. Advantageously, this is accomplished while maintaining sufficient strength in the teeth 14, and while also maintaining sufficient clearance to allow operation of the conveyor in the reverse direction to clear jams, as needed.

Further, the extra material (between 3–5 millimeters) added to provide the raised forward landing area 28 at the point of contact of the chain link L, provides increased wear capability. This additional material present on each tooth 14 to wear also increases the effective life of the sprocket 10. Further, this additional wear is provided without increasing the relative mass of the sprocket as equal material is removed to provide a lower profile of the rearward landing area 30. The forward shift of the teeth 14, and the extra material at the landing area 28, significantly enhance the service life of the teeth 14 by preventing premature engagement between the flight F/clamp M and the forward flank 20 of the trailing tooth 14, thus allowing uninterrupted conveyor operation over longer operating intervals. Such an approach to solve the wear problem is new to the art and represents a significant advance over previous sprocket designs.

In summary, numerous benefits have been described which result from employing the concepts of the present invention. Together, the forward offset or asymmetrical design of the teeth 14, the relatively raised forward landing area 28 and the relatively lowered rearward landing area 30, function in concert to increase operating efficiency by allowing increased wear before interference develops. Accordingly, the useful life of the sprocket 10 is significantly enhanced with proportionate savings in repair and maintenance expenses, and advantageous increases in productivity.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with breadth to which they are fairly, legally and equitably entitled.

We claim:

1. A unidirectional sprocket for engaging a chain and providing an extended service life, comprising:
   a hub;
   an array of sprocket teeth substantially radially extending from said hub and defining a pitch circle; each sprocket tooth including a root at a point of connection with said hub, an outwardly projecting point forming a distal end from the pitch circle outwardly, a forward drive face and rearward face extending from the pitch circle inwardly, forward and rearward flanks extending outwardly from said root, and forward and rearward landing areas extending between said faces and said flanks;
   said sprocket being characterized by said sprocket teeth each being asymmetrical and positioned with a forward offset;
   whereby extended wear capability is provided in the forward direction to increase the life of the sprocket.

2. The sprocket set forth in claim 1, wherein the forward and rearward landing areas of adjacent teeth define a chain seat for engaging the horizontal links of the chain.

3. The sprocket set forth in claim 2, wherein said rearward landing area is longer than said forward landing area.

4. The sprocket set forth in claim 3, wherein the ratio of elongation between said rearward and forward landing areas as measured at said pitch circle is between substantially 1.5:1 and 2.0:1.

5. The sprocket set forth in claim 3, wherein the ratio of elongation between said rearward and forward landing areas as measured at said pitch circle is substantially 1.7:1.

6. The sprocket set forth in claim 1, wherein each said tooth is substantially 38 millimeters thick between said forward and rearward faces at said pitch circle.

7. The sprocket set forth in claim 2, wherein said forward landing area is raised and extends radially outward more than said rearward landing area by substantially 3–5 millimeters.

8. The sprocket set forth in claim 7, wherein the distance (1) between said root and said forward landing area is between substantially 70–76 millimeters at the leading edge; and (2) between said root and said rearward landing area is between substantially 57–64 millimeters at the trailing edge.

9. The sprocket set forth in claim 8, wherein the distance (1) between said root and said forward landing area is substantially 73 millimeters at the leading edge; and (2) between said root and said rearward landing area is substantially 60 millimeters at the trailing edge.

10. The sprocket set forth in claim 1, wherein the teeth are split forming twin tooth sections engaging the horizontal links of the chain, the alternate vertical links nesting between said sections.

* * * * *